United States Patent [19]

Impagliazzo

[11] Patent Number: 6,148,106

[45] Date of Patent: Nov. 14, 2000

[54] CLASSIFICATION OF IMAGES USING A DICTIONARY OF COMPRESSED TIME-FREQUENCY ATOMS

[75] Inventor: John M. Impagliazzo, Wakefield, R.I.

[73] Assignee: The United States of America as represented by the Secretary of the Navy, Washington, D.C.

[21] Appl. No.: 09/111,370

[22] Filed: Jun. 30, 1998

[51] Int. Cl.$^7$ ..................................................... G06K 9/62
[52] U.S. Cl. ........................................... 382/224; 382/226
[58] Field of Search ...................................... 382/224, 226, 382/232, 233, 239, 304, 235, 236; 364/274, 513, 274.9

[56] References Cited

U.S. PATENT DOCUMENTS

| | | | |
|---|---|---|---|
| 3,192,505 | 6/1965 | Rosenblatt | 340/146.3 |
| 3,267,439 | 8/1966 | Bonner | 340/172.5 |
| 5,052,043 | 9/1991 | Gaborski | 382/14 |
| 5,892,847 | 4/1999 | Johnson | 382/232 |

*Primary Examiner*—Bijnn Tadayah
*Assistant Examiner*—Seyed Azarian
*Attorney, Agent, or Firm*—Michael J. McGowan; Robert W. Gauthier; Prithvi C. Lall

[57] ABSTRACT

A method for automatically classifying test images based on their similarities with a dictionary of example target and non-target images. The method operates by receiving a test image and then initializing variables for an iteration count and for the linear expansion of the test image. The test image is then projected onto each one of the target and non-target images in the dictionary, wherein a maximum scaling coefficient is selected for each iteration. A residue is then generated, and the linear expansion of the test image is increased until a predetermined number of iterations have been performed. Once this predetermined number of iterations have been performed, the sum of the scaling coefficients belonging to the target examples in the dictionary is compared to the sum of the scaling coefficients belonging to the non-target examples in the dictionary to determine whether the image is a target signal or a non-target signal.

18 Claims, 1 Drawing Sheet

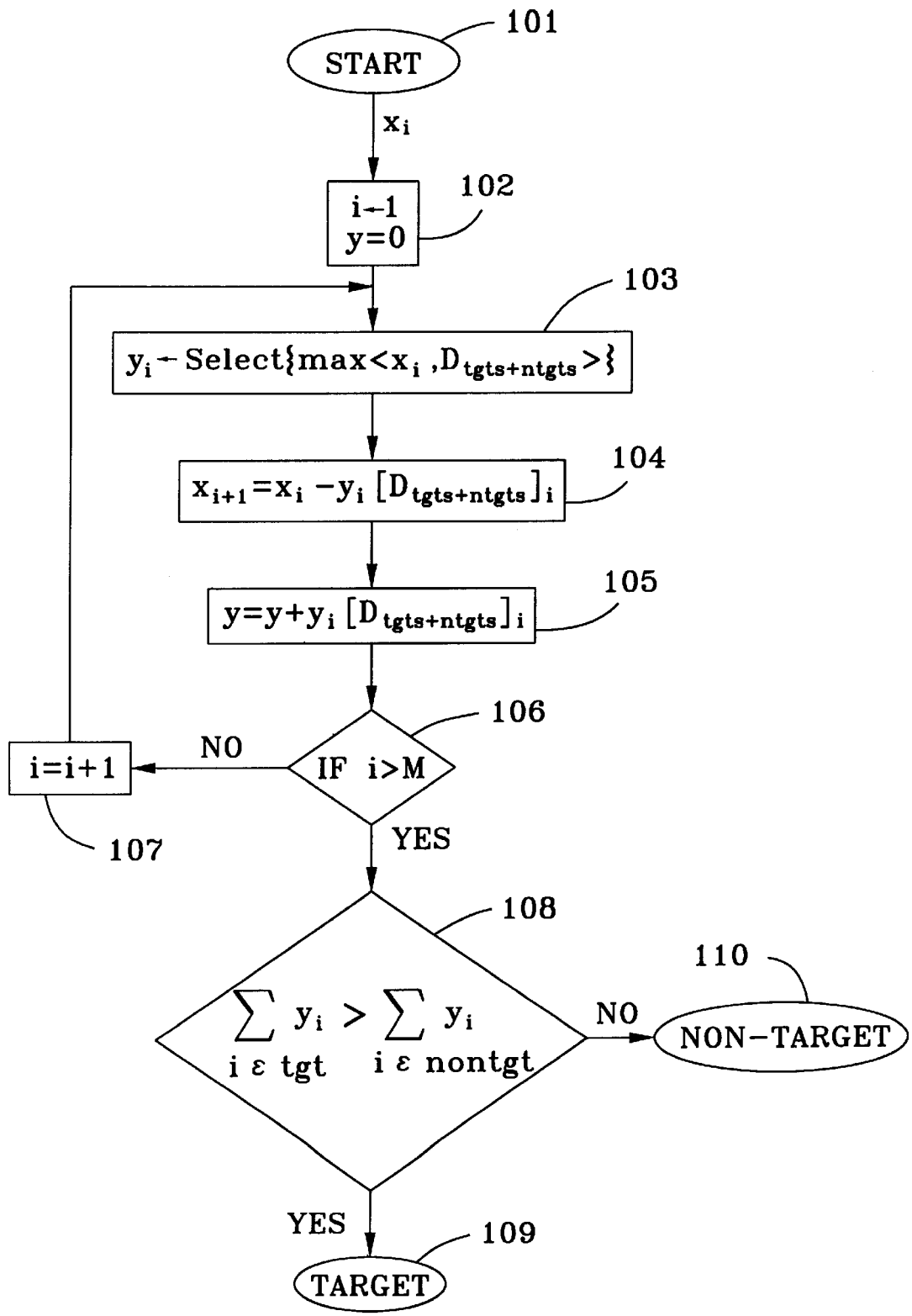

CLASSIFICATION OF IMAGES USING A DICTIONARY OF COMPRESSED TIME-FREQUENCY ATOMS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates to the field of image processing techniques, and more particularly to a method for automatically classifying test images based on their similarities with a dictionary of example target and non-target images organized according to class.

(2) Description of Related Art

The use of automatic pattern recognition systems and image classifiers for rapid identification and classification of input patterns (images) into one of several classes is well known in the art. Image classifiers have both military and civilian applications. For example, such systems can be used by a military combatant in a naval conflict to identify an unknown sonar target as a friend or foe, and thereby enable one to make an informed decision as to whether to attack the target. The systems are also used by civilians, for example, in medical screening and diagnostic applications. Additionally, image classification techniques are used for quality control in manufacturing applications.

Existing pattern recognition and image classification systems are typically based upon one of several conventional classification techniques. The conventional techniques for classifying images typically use a minimum set of manually distilled classification parameters from examples of known images which have been experimentally demonstrated to accurately classify a database of images into the correct class. For example, in the case of statistical classifiers, these parameters (features) consist of statistical moments scored according to a threshold criteria or nearest neighbor criteria. The features may also be based on ad hoc measurements or values defining properties of the image to be classified which have been proven successful on a test database. Additionally, classification parameters may be based on a model of the mechanisms which distinguish a class of images. Such conventional methods are well known in the art with examples being found in U.S. Pat. No. 5,291,563 to Maeda, and U.S. Pat. No. 5,452,369 to Lionti et al.

In general, conventional automatic classifiers process a small set of clues derived from a large sequence of data representing the image to be classified. These conventional classification methods suffer from several significant drawbacks. One drawback is that the classification parameters or features used to classify an image are only a partial representation of the information in the image. Additionally, the methods are biased by the ad hoc algorithm used to quantitatively score the parameters used for classification. Furthermore, the existing techniques often are not easily modified for new or changing operational environments or when new input images or outcome classes are added. Often such changes require changing or modifying the features used for classification.

Accordingly, there is a need for a classification method which overcomes these drawbacks.

SUMMARY OF THE INVENTION

It is therefore an object of the present invention to provide a method of classification which operates by comparing a near-complete representation of a test image to a dictionary of example target and non-target images.

Another object of the present invention is the provision of a classification method which is easily augmented or refined for new operating environments.

The present method accomplishes these objects by receiving a test image and then initializing variables for an iteration count and for a linear expansion of the test image. The test image is then projected onto each one of the target and non-target images in the dictionary. A scaling coefficient is then applied for each successive iteration, wherein the scaling coefficient is set to the maximum value produced by the projections of the test image onto the dictionary of target and non-target example images. A residue is then generated, and the linear expansion of the test image is increased until a predetermined number of iterations have been performed.

Once this predetermined number of iterations have been performed, the sum of the scaling coefficients belonging to the target examples in the dictionary is compared to the sum of the scaling coefficients belonging to the non-target examples in the dictionary. If the sum of the scaling coefficients belonging to the target examples is greater than the sum of the scaling coefficients belonging to the non-target examples, then the test signal is identified as a target signal. If, however, the sum of the scaling coefficients belonging to the target examples is less than the sum of the scaling coefficients belonging to the non-target examples, then the test signal is identified as a non-target signal.

BRIEF DESCRIPTION OF THE FIGURES

A more complete understanding of the invention and many of the attendant advantages thereto will be readily appreciated and may be obtained from consideration of the following detailed description when considered in conjunction with the sole accompanying drawing which shows a flow diagram depicting an exemplary embodiment of the image classification technique according to the present invention.

DESCRIPTION OF THE PREFERRED EMBODIMENT

The present invention discloses a method for automatically classifying two-dimensional test images based on their similarities with a dictionary of example images organized according to class. Like conventional image classification methods, the new method disclosed herein can be used for a variety of applications.

Images classified by the method of the present invention comprise two-dimensional arrays of pixels. Each pixel is assigned a value representing the gray level of that pixel. The pixel values can be distributed over any range. Additionally, the images can be comprised of more than one component array, such as color images. The image can be generated from an input signal using any conventional means such as digital cameras, scanners, acoustic imaging, an image previously stored in a digital format, or the like. In addition, the image can be processed as a whole or it can be divided into sub-images, with each sub-image being processed as a test image. Similarly, if a specific region of interest in the original image can be identified, the region can be processed as the test image.

This classification is accomplished by projecting a representation of the test image onto each of the example images in the dictionary. The projection process produces a representation of the test image as a linear expansion of scaled correlation coefficients in terms of the dictionary examples. The unknown image is then classified by comparing the scaling coefficients wherein if the sum of the scaling coefficients belonging to the target examples is greater than the sum of the scaling coefficients belonging to the non-target examples the unknown test image is identified as a target image, and otherwise the unknown test signal is identified as a non-target image.

The classification method disclosed herein employs an image compression technique which uses an invertible, lossy time-frequency transform. Although the images do not need to be compressed for the classification method of the present invention to operate. However, given that most images contain large numbers of pixels and that image processing is a computationally intensive procedure, the test images and the dictionary of images are usually compressed. An exemplary image compression algorithm which can be employed in connection with the method of the present invention is disclosed in U.S. Pat. No. 5,757,974 to Impagliazzo et al. entitled System and Method for Data Compression. Other image compression techniques known in the art may also be used provided such methods maintain (preserve) a large majority of the original image information and can be reconstructed.

Images compressed utilizing the method of U.S. Pat. No. 5,757,974 or the like contain a large majority of the original image information and can be readily reconstructed. Thus, when a compressed image is projected onto an example in a dictionary, all of the captured information is compared and the comparison is scored. As a result, this method is able to more accurately reproduce an unknown target image from the classification parameters than conventional methods.

The comparison is performed in the time-frequency domain because a substantial computational advantage is realized, equal to the compression ratio applied to the dictionary examples and test image. This is typically one to two orders of magnitude or larger. In addition, the score is a near complete representation of the test image. Also, since the dictionary consists of compressed time frequency transformed images, it can be augmented to include additional entries to refine the classifiers performance in other environments. This flexibility can be used to rapidly construct a classifier by developing a dictionary in a lab, on a test range, or in a similar controlled environment closely resembling an operational area of interest.

The present invention uses a matching pursuit algorithm disclosed in S. G. Mallat and Z. Zhang, *Matching Pursuit With Time-Frequency Dictionaries,* IEEE Trans. On Sig. Proc., Vol. 41, no. 12, pp. 3397–3415, December 1993, which allows a signal function to be decomposed into a linear expansion of functions belonging to a redundant dictionary of waveforms. In the present method, these waveforms are time-frequency atoms computed from both sample target and non-target images. It is assumed that the time-frequency atoms consist of a pattern of wavelet coefficients related to the local structure of the target. Without such an assumption, this information would otherwise be difficult to detect from individual coefficients because the forward transform diffuses the information across the entire basis. The present invention therefore employs an existing algorithm for a new purpose, i.e., image classification.

The advantage of the wavelet domain theory embodied in the method disclosed in the aforementioned article is that the respective image and dictionary waveforms can be compressed using wavelet image compression techniques, thereby preserving information about the local target structure without making any assumptions about the nature of the target. This compression, in turn, minimizes the computational requirements on the matching pursuit algorithm which defines a family of vectors $$D = (g_\gamma)_{\gamma \in \Gamma}$$

in H, where $H=L^2(R)$, such that $\|g_\gamma\|=1$. Letting $f \in H$, a linear expansion of f is computed over a set of vectors selected from D to best match the local target structure. This is done by successive approximations of f with orthogonal projections on elements of D. Letting $g_{\gamma 0} \in D$, the vector f can be decomposed into $$f = \langle f, g_{\gamma 0}\rangle g_{\gamma 0} + Rf \tag{1}$$

where Rf is the residual vector after approximating f in the direction of $g_{\gamma 0}$. The element $g_{\gamma 0}$ is orthogonal to Rf, hence $$\|f\|^2 = |\langle f, g_{\gamma 0}\rangle| + \|Rf\|^2. \tag{2}$$

To minimize $\|Rf\|$, $g_{\gamma 0} \in D$ is selected such that $$|\langle f, g_{\gamma 0}\rangle|$$

is maximized. To consider the iterative approach, let $R^0 f = f$. To compute the $n^{th}$ order residue $R^n f$, for $n \geq 0$, an element $g_{\gamma n} \in D$ is chosen with the choice function C, which best matches the residue $R^n f$. The residue $R^n f$ is subdecomposed into $$R^n f = \langle R^n f, g_{\gamma n}\rangle g_{\gamma n} + R^{n+1} f \tag{3}$$

which defines the residue at the order n+1. Since $R^{n+1}f$ is orthogonal to $g_{\gamma n}$ $$\|R^n f\|^2 = \|R^n f, g_{\gamma n}\|^2 + \|R^{n+1}f\|^2. \tag{4}$$

Extending this decomposition to order m, equation (3) yields:

$$f = \sum_{n=0}^{m-1} \langle R^n f, g_{\gamma n}\rangle g_{\gamma n} + R^m f \tag{5}$$

and equation (4) yields an energy conservation equation:

$$\|f\|^2 = \sum |\langle R^n f, g_{\gamma n}\rangle|^2 + \|R^m f\|^2 \tag{6}$$

The original vector f is decomposed into a sum of dictionary elements that are chosen to best match its residues. Although the decomposition is nonlinear, it maintains an energy composition as if it was a linear orthogonal decomposition.

In utilizing the matching pursuit algorithm for target classification, the projection of the test image function onto each of the dictionary waveforms is computed. The waveform which best matches the image function is selected for the iteration and a residue is computed from the image function. The residue is formed by subtracting the selected waveform scaled by the correlation coefficient, from the image function to produce a new image function for the next iteration. After the last iteration, the image function is represented as a linear expansion of the scaled dictionary waveforms.

Target-like objects are discriminated from non-target image functions by comparing the energy in the dictionary's target waveform to that of the dictionary's non-target waveforms: The class associated with the greater energy is assigned to the image waveform. This process is shown in flowchart form in the sole FIGURE in the case. The process starts as step 101 with the receipt of a test image $x_i$. At step 102, variables for the iteration count i and the linear expansion of the test image denoted by y are initialized, with i being set to 1 and y being set to 0.

At step 103, test image $x_i$ is projected onto each of the images in the dictionary of example target and non-target images $D_{tgts+ntgts}$ and a scaling coefficient is identified. The scaling coefficient $y_i$ for the $i^{th}$ iteration is set to the maximum value produced by the projections of $x_i$ onto the dictionary of images $D_{tgts+ntgts}$. The dictionary image which produces the maximum value when $x_i$ is projected onto it, identified as $[D_{tgts+ntgts}]i$, is associated with the scaling coefficient $y_i$. The projection of $x_i$ onto the dictionary image is given as the inner product $$\langle x_i, D_{tgts+ntgts} \rangle$$

which produces a scalar quantity.

At step 104, the residue $x_{i+1}$ is calculated by subtracting the dictionary image $[D_{tgts+ntgts}]i$, identified in step 103 as producing the maximum result, scaled by $y_i$ from $x_i$. That is, the residue $x_{i+1}$, is given as:

$$x_{i+1} = x_i - y_i[D_{tgts+ntgts}]_i \qquad (7)$$

At step 105, the linear expansion of scaled dictionary waveforms y is refined by adding the scaled dictionary waveform $y_i[D_{tgts+ntgts}]i$ to the existing linear expansion of scaled dictionary waveforms y. That is, $$y = y - y_i[D_{tgts+ntgts}]_i \qquad (8)$$

The process of projecting $x_i$ onto each waveform in the dictionary, generating the residue, and refining the linear expansion y is repeated until M iterations have been performed. If, as shown at step 106, fewer than M iterations have been performed, then at step 107 the number of iterations is incremented by 1 and the process is repeated from step 103. If however, M iterations have been performed, then at step 108 the sum of the scaling coefficients $y_i$ belonging to the target examples in the dictionary $D_{tgts+ntgts}$ is compared to the sum of the scaling coefficients $y_i$ belonging to the non-target examples in the dictionary. If the sum of the scaling coefficients $y_i$ belonging to the target examples is greater than the sum of the scaling coefficients $y_i$ belonging to the non-target examples, then the test signal is identified at step 109 as a target signal. If, however, the sum of the scaling coefficients belonging to the target examples is less than the sum of the scaling coefficients belonging to the non-target examples, then at step 110 the test signal is identified as a non-target signal.

The classification of target-like image functions is further refined by a back-propagation neural network. Such networks, which use artificial intelligence, are well known in the art and are used in the classification of test images. The neural network used need not be a back-propagation network but can be any type of neural network for classifying images. Although use of a neural network is not required to use the method of the present invention, such networks have been found to reduce the number of false alarms when classifying images. In using a neural network to further classify the test images, only the images identified as being targets are sent to the network. Because the input to the network is limited to those images which have been identified as targets, the construction of such a network is much simpler than that of a network that must distinguish targets from the set of all images. The input to the neural network can be the original image, a compressed image, a non-compressed image in the time frequency domain, or the linear expansion of scaled dictionary waveforms y.

In order to implement the matching pursuit/neural network classifier, it is necessary to divide the training set of data into subsets A and B. Half of the training set, subset A, is used as target waveforms for the matching pursuit dictionary. Non-target waveforms are also in the dictionary, but are selected from areas not proximate to the target. The remaining half of the training set, subset B, is processed using the matching pursuit algorithm having subset A in the target dictionary.

These results are then scored to form two lists for training the neural network: one of the functions for correctly classified targets, and one for the false alarms. The list of functions for correctly classified targets is augmented by an additional set generated from targets in training subset B with offset centers. The target and false alarm lists are used to train a neural network to discriminate targets from false alarms for the limited set of target-like image functions classified by the matching pursuit algorithm.

Successful application of this method is not limited to two-dimensional target images. The method described herein can be easily applied to classification of one dimensional signals or n-dimensional signals. In n-dimensional space, the compressed time-frequency representation of the signals is reshaped as a vector. The test signal vector is then projected onto equivalent signal vectors for each of the examples in the dictionary. In the one dimensional case, the compressed time-frequency representation of the signals is a vector. Typically, the number of iterations taken range between one an ten, but an alternative approach would be to increase the number of iterations further, but not to exceed the number of entries in the dictionary.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A method for classifying an unknown test image by comparing the unknown test image to a dictionary of example images each of which is associated with an outcome class, comprising the steps of:

receiving the unknown test image;

projecting the unknown test image onto each one of the example images in the dictionary;

identifying a scaling coefficient wherein the scaling coefficient is set to a maximum value produced by the projections of the unknown test image onto the dictionary of example images;

generating a residue of the unknown test image based on a difference between the unknown test image and the example image producing the maximum value scaled by the scaling coefficient;

refining a linear expansion of the unknown test image by adding the scaled example image to the linear expansion;

iteratively using the residue as the unknown test image in projecting, identifying, generating and refining for a selected number of iterations; and classifying the unknown test image by selecting the outcome class within the linear expansion having the largest sum of scaling coefficients for the example images associated with the outcome class.

2. The method according to claim 1, wherein the unknown target image is compressed using a lossy time-frequency transform.

3. The method according to claim 2, wherein the lossy time-frequency transform is invertible.

4. The method according to claim 1, wherein the unknown target image is a one dimensional image.

5. The method according to claim 1, wherein the dictionary of example target and non-target images can be augmented to include additional images.

6. The method according to claim 1, further comprising the step of using a neural network to further classify the unknown test image for the selected outcome class so as to reduce the number of false alarms encountered when classifying unknown test images.

7. The method according to claim 6, wherein the neural network is a back-propagation network.

8. A method for classifying unknown test images based on their similarities with a dictionary of example target and non-target images, comprising the steps of:

receiving one of the unknown test images;

identifying a scaling coefficient, wherein the scaling coefficient is set to a maximum value produced by taking the inner product of the unknown test image and each one of the example target and non-target images in the dictionary scaling the dictionary by the scaling coefficient;

substituting a difference between the unknown test image and the scaled dictionary as the unknown test image;

repeating the steps of identifying a scaling coefficient, scaling and substituting until a predetermined number of iterations have been performed; and classifying the test image by separately summing the scaling coefficients associated with the target and the non-target images in the dictionary and choosing a classification corresponding to the greatest sum.

9. The method according to claim 8, wherein the test image is classified as a target image if the sum of the scaling coefficients associated with the target images is greater than the sum of the scaling coefficients associated with the non-target images.

10. The method according to claim 8, further comprising the step of using a neural network to further classify a test image classified as a target image.

11. The method according to claim 10, wherein the neural network is a back-propagation network.

12. The method according to claim 11, wherein the unknown target image is compressed using a lossy time-frequency transform.

13. The method according to claim 12, wherein the lossy time-frequency transform is invertible.

14. The method according to claim 10, wherein the unknown target image is a one dimensional image.

15. The method according to claim 1, wherein the unknown target image has more than two dimensions.

16. The method according to claim 8, wherein the unknown target image has more than two dimensions.

17. The method according to claim 10, wherein the unknown target image has more than two dimensions.

18. A method for classifying unknown test images based on their similarities with a dictionary of example target and non-target images, comprising the steps of:

receiving one of the unknown test images;

projecting the test image onto each of the images in the dictionary of example target and non-target images;

identifying a scaling coefficient, wherein the scaling coefficient is set to a maximum value produced by the projection of the test image onto each one of the example target and non-target images in the dictionary and is associated with the image identified as producing the maximum value;

generating a residue of the test image;

refining a linear expansion of scaled dictionary images;

repeating, using the residue as the test image, the steps of projecting the test image onto the dictionary, identifying a scaling coefficient, generating a residue and refining the linear expansion until a predetermined number of iterations have been performed; and classifying the test image by comparing the sum of the scaling coefficients associated with the target and non-target images in the dictionary.

* * * * *